R. G. STARKWEATHER.
MAIL AND PARCEL COLLECTING AND DISTRIBUTING SYSTEM.
APPLICATION FILED NOV. 15, 1911.
1,024,707.
Patented Apr. 30, 1912.
2 SHEETS—SHEET 1.
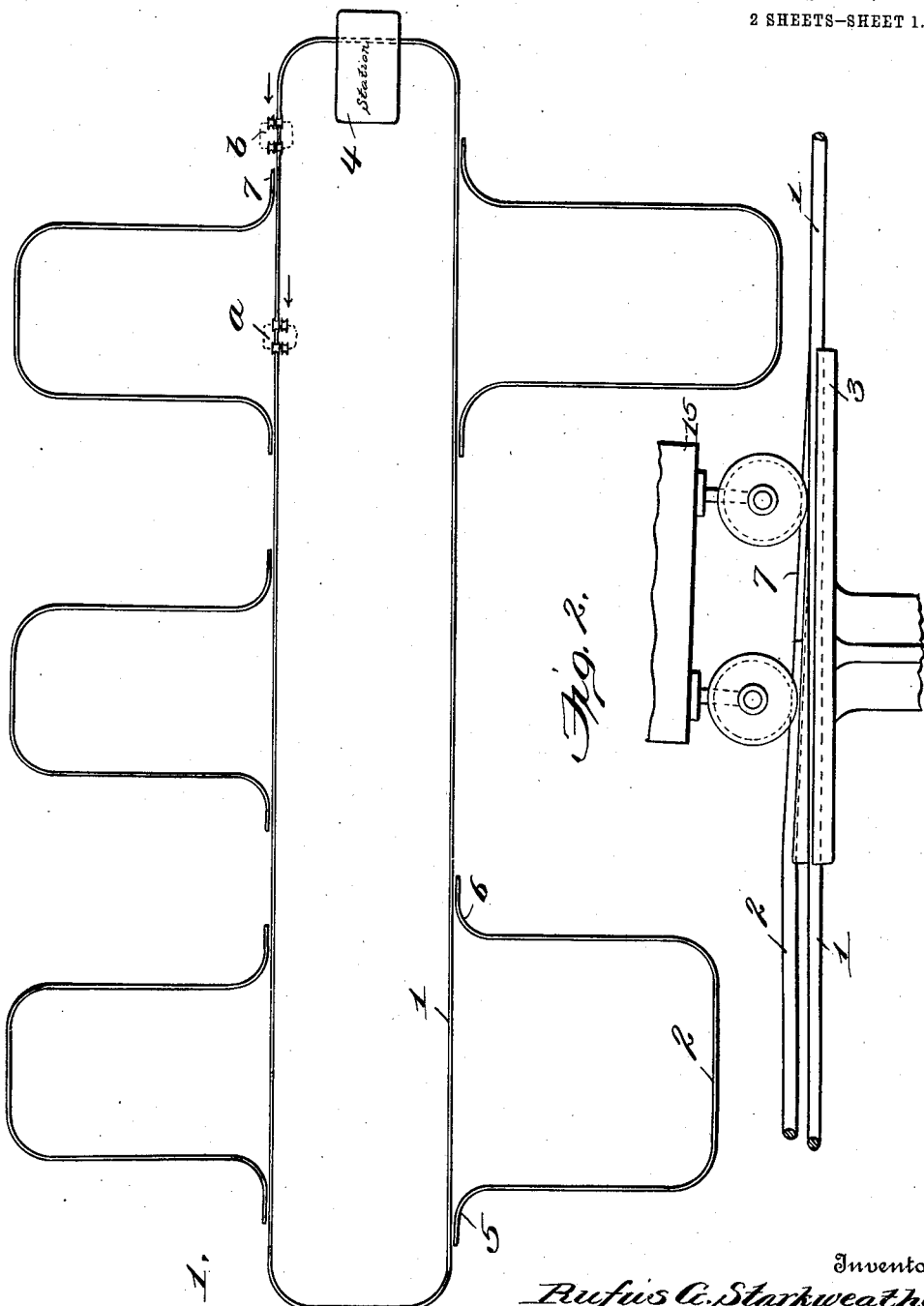

R. G. STARKWEATHER.
MAIL AND PARCEL COLLECTING AND DISTRIBUTING SYSTEM.
APPLICATION FILED NOV. 15, 1911.
1,024,707.
Patented Apr. 30, 1912.
2 SHEETS—SHEET 2.
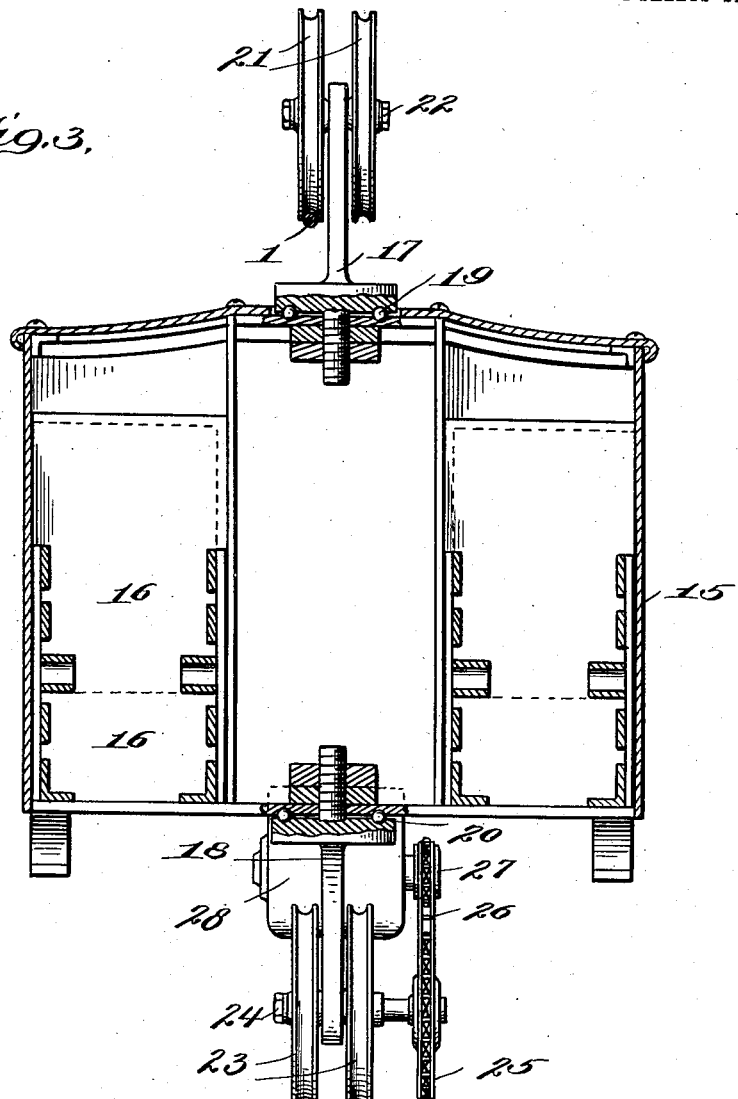
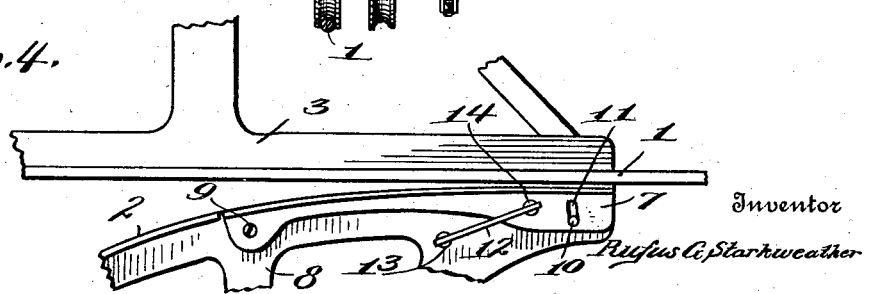

UNITED STATES PATENT OFFICE.

RUFUS G. STARKWEATHER, OF JORDANVILLE, NEW YORK.

MAIL AND PARCEL COLLECTING AND DISTRIBUTING SYSTEM.

1,024,707. Specification of Letters Patent. Patented Apr. 30, 1912.

Original application filed August 10, 1911, Serial No. 643,430. Divided and this application filed November 15, 1911. Serial No. 660,404.

*To all whom it may concern:*

Be it known that I, RUFUS G. STARKWEATHER, a citizen of the United States, residing at Jordanville, in the county of Herkimer and State of New York, have invented new and useful Improvements in Mail and Parcel Collecting and Distributing Systems, of which the following is a specification.

My present invention relates to improvements in mail and parcel collecting and distributing systems of the type employing a track or tracks and a wheeled car to travel thereon, and the primary object of this invention is to provide the car and track with means whereby the car may be caused to traverse the main line and return directly to the central station or starting point or the car may be caused to traverse branch lines, the route to be followed by the car being determined by the manner of placing the car upon the track at the starting point, switches being employed which, however, do not require setting or other manipulation in determining the route to be followed by the car.

The present application is a division of my co-pending application, Serial No. 643,430 filed August 10, 1911.

In the accompanying drawings: Figure 1 is a diagrammatic view of a track for a mail and parcel collecting and distributing system, the track having a main line and a plurality of branch lines; Fig. 2 is a side elevation of a section of the track adjacent to one of the switches leading from the main line to one of the branches; Fig. 3 represents a vertical section through a car showing the wheels thereof mounted on the upper and lower tracks; and Fig. 4 is a detail plan view of one of the switches.

Similar parts are designated by the same reference characters in the several views.

In the accompanying drawing the invention is applied to systems of the class mentioned wherein upper and lower tracks are used and each car has wheels to travel thereon. In the present instance each track embodies a main line wire or rail 1 and a branch line wire or rail 2, these wires or rails being supported at suitable intervals by brackets 3 mounted on appropriately placed posts. A station 4 is arranged at a suitable point on the main line from which the cars start and to which they return. The ends 5 and 6 of each branch line are turned in opposite directions and these ends of the branch line are provided with switches. Each switch in the present instance comprises a switch member 7 which is pivoted on a suitable supporting bracket 8 by the pivot pin 9, and the pivoting movement of this switch member in a direction toward and from the adjacent wire or rail 1 of the main line is limited by a pin 10 which is secured to the bracket and operates in a slot 11 formed in the switch member, this pin and slot preventing undue movement of the switch member so as to prevent the switch member from contacting with the main line wire or rail 1 and to prevent undue separation of the switch member with respect to this main line or rail. The switch member, however, is preferably yieldably pressed toward the main line wire or rail 1 by a spring 12 one end of which is fixed in a slotted pin 13 secured to the bracket 8 while the opposite end of the spring operates in a slotted pin or projection 14 secured to the pivoted switch member.

The car 15 shown in the present instance is of the same general construction as that described in the aforesaid application, it having compartments 16 for the reception of the mail or parcel holders and it also has compartments or magazines to contain the holders which are to be distributed by the car. A pair of brackets 17 are provided at the top of the car and a similar pair of brackets 18 are arranged at the bottom of the car, these brackets being preferably swiveled so as to turn on vertical axes by the bearings 19 and 20, these swivel mountings for the brackets enabling the latter to turn and thereby enable the wheels of the car to traverse curves in the track without danger of derailment. Each of the upper brackets 17 carries a pair of grooved wheels 21 which are mounted on a horizontal supporting shaft 22. Each of the lower brackets 18 carries a similar pair of grooved wheels 23 which are mounted on a shaft 24 supported by the respective bracket, and the shaft 24 for one of the lower pairs of wheels is extended laterally and provided with means for applying propelling power thereto, this shaft being shown for example as provided with a sprocket wheel 25 which coöperates with a driving chain 26, the latter coöperating with a sprocket pinion 27 on the shaft of an electric motor 28. The motor 28 is mounted on the respective bracket 18 whereby the relation between the motor and the respective driving wheels will be maintained irrespective of turning movements of the bracket. The motor preferably receives electric current to operate it from the upper and lower tracks which serve as electrical conductors, any suitable means being provided for electrically connecting the motor to the upper and lower wheels of the car.

From the foregoing it is to be observed that the car is equipped with two complete sets of wheels and either of these sets of wheels is capable of operating upon the upper and lower tracks. The route to be followed by the car is determined according to which set of wheels is placed upon the track at the starting point or station. For example, if the branch lines lead to the right from the main line as shown in Fig. 1, the car will follow the main line 1 and return directly to the starting point without following the branch lines, if the right hand set of wheels on the car is placed on the main line track as indicated by the car $a$ in Fig. 1 for the reason that when the right hand set of wheels on the car engages the main line track the left hand set of wheels on the car will be idle and will clear the switch member 7. If, however, the left hand set of wheels on the car is placed upon the track at the starting point, as represented by the car $b$ in Fig. 1, the car will then follow the main line until it reaches a branch line whereupon the right hand wheels of the car will engage the switch member 7 to the right of the main line. The riding of the right hand set of wheels on this switch member which leads away from the main line will cause the left hand wheels to leave the main line track, the car then traversing the branch line while supported on its right hand set of wheels. When the car returns to the main line after traversing the branch line, the left hand set of wheels will be returned to the main line track and the right hand set of wheels will pass off the end of the switch member 7 so that the right hand set of wheels will be again idle until the next branch line is reached, the car while traveling along the main line being supported by the left hand set of wheels. In order to facilitate engagement and disengagement of the car wheels with reference to the main line track when the car is leaving the main line to follow a branch line and is being returned from the branch line to the main line, the switch member 7 is preferably tilted or inclined, as shown in Fig. 2, so that the car wheels will be elevated sufficiently to enable the flanges thereon to pass laterally over the main line track.

I claim as my invention:—

1. In an apparatus of the class described, the combination of a main line rail, a branch line rail, a car having two sets of laterally spaced wheels, either set adapted to travel on the branch line rail, and a switch operative to guide one set of wheels onto the branch line rail and to remove the other set of wheels from the main line rail.

2. In apparatus for collecting and distributing mail and parcels, the combination of a single main line track rail, a single branch line track rail, a car provided with two sets of laterally spaced grooved wheels, either of said sets of wheels being adapted to coöperate with the main line track rail, and one of said sets of wheels being adapted to coöperate with the branch line track rail, and a switch at one side of the main line rail and operative to mount one of said sets of wheels on the branch line rail and to remove the other set of wheels from the main line rail.

3. In an apparatus of the character described, the combination of a single main line track rail, a single branch line track rail, a switch placed at one side of the main line rail and leading to the branch line rail, and a car having two sets of laterally spaced wheels adapted to travel respectively on the main and branch line rails.

In testimony whereof I have hereunto set my hand in presence of two subscribing witnesses.

RUFUS G. STARKWEATHER.

Witnesses:
ARLEIGH D. RICHARDSON,
GRACE S. BEECHWOOD.

---

Copies of this patent may be obtained for five cents each, by addressing the "Commissioner of Patents, Washington, D. C."